Aug. 30, 1949.                      R. M. ALDEN                      2,480,313
                              PLASTIC MOLDING MACHINE
Filed Nov. 16, 1944                                            5 Sheets-Sheet 4

INVENTOR
RAYMOND M. ALDEN
BY
ATTORNEYS

Patented Aug. 30, 1949

2,480,313

UNITED STATES PATENT OFFICE 2,480,313

PLASTIC MOLDING MACHINE

Raymond M. Alden, Rockford, Ill.

Application November 16, 1944, Serial No. 563,635

19 Claims. (Cl. 18—30)

This invention relates to apparatus for the automatic molding of plastics such as thermoplastic materials and thermosetting plastic materials. While the apparatus herein shown is especially adapted for the use of thermosetting materials practically all thermoplastic types of materials with the exception of polystyrene may be used, this latter material being unsuited for the process and apparatus because it does not respond to the high frequency heating which is employed in this invention.

One of the objects of this invention is to provide new and improved apparatus for the automatic molding of plastic whereby to effect substantial saving of time and increase in production over the prior practice. In furtherance of this general object, my invention contemplates the provision of novel combinations of apparatus for automatically handling the plastic material through cycles of operations including measuring or weighing the material, preforming the measuring material into pellets, subjecting the preform to heating by high frequency induction to a condition suitable for immediate molding, passage of the heated pellet directly to the molding operation, and discharge of the molded article, these operations being performed in overlapping sequence whereby the improved production is obtained.

Another object of my invention is to provide improved apparatus for automatically molding plastic materials including facilities for preheating the material in pellet form by high frequency in a particularly advantageous manner.

Another object of my invention is to improve the molding of plastic materials by the elimination of the breakage of small core pins and the dislocation of small inserts, which frequently occur when thermosetting materials are used in the ordinary compression molding process. Under the usual conditions of compression molding the small core pins are forced through a mass of granular or semiplastic material during the closing of the mold and are easily broken or dislocated. In the execution of many compression molding tasks, certain core pins, however much desired, must be omitted because of the probability of their breakage or dislocation, thus requiring subsequently a drilling operation in the molded product which could have been avoided if the core pin could have been used. In accordance with the present invention thermosetting materials are forced into the mold cavity in a plastic condition and may therefore easily flow around core pins without danger of breakage or dislocation of the pins. Thermoplastic materials may also be molded with the machine of the invention by controlling the preheating of the pellets in accordance with the characteristics of the particular plastic material used. Another advantage residing in the present invention is that more accurate castings in general may be made in accordance with the invention than could be made under ordinary compression molding practice.

Another object and advantage of the invention is to make possible the satisfactory molding of thicker sections than is ordinarily practical in compression type molding practice.

A further object and advantage of the invention is the rapid production of molded products of uniform quality assured by the automatic control of the molding machine.

A further object of the invention is to provide an improved plastic molding machine in which preformed pellets are heated in such manner as to render them freely moldable before entering the dies whereby substantially less pressure is required in the molding operation than is needed in prior commercial machines.

A further object is to provide apparatus embodying improvements of the character described which may be incorporated in a machine having either automatic or manual control.

A further object is to provide improved control mechanism for an automatic plastic molding machine.

Other objects and advantages of the invention will be alluded to hereinafter or should become apparent from a perusal of the following specification wherein a preferred form of the invention is disclosed and described.

The apparatus, preferably, includes a device for measuring a charge of plastic material in powdered, or granular, or beaded condition. However, my invention contemplates the provision of a predetermined charge of the material obtained by weighing as distinguished from measuring. For example, when my invention is used with materials of a kind which are not readily measured, such as fabric base materials, cotton flock materials, and some mineral filled materials, an automatic weighing of such materials would be performed in place of automatic measuring of the charge. In the present illustrative embodiment the measured charge is dropped into a cylinder where it is compressed sufficiently to form a compact "preform." This preform will contain enough material for filling simultaneously one or more mold cavities into which it is later injected after heating. The preform is then dropped into a preheating chamber where it is subjected to high frequency heating at controlled temperatures for a controlled time interval to make the preform sufficiently plastic to permit its ready injection into the mold cavity or cavities, while avoiding, in the case of thermosetting materials, such temperature and lapse of time as would cause the material to set prior to injection. After preheating, the preform is then injected under high pressure into the mold and maintained there under pressure until the plastic material has set.

Figure 1:
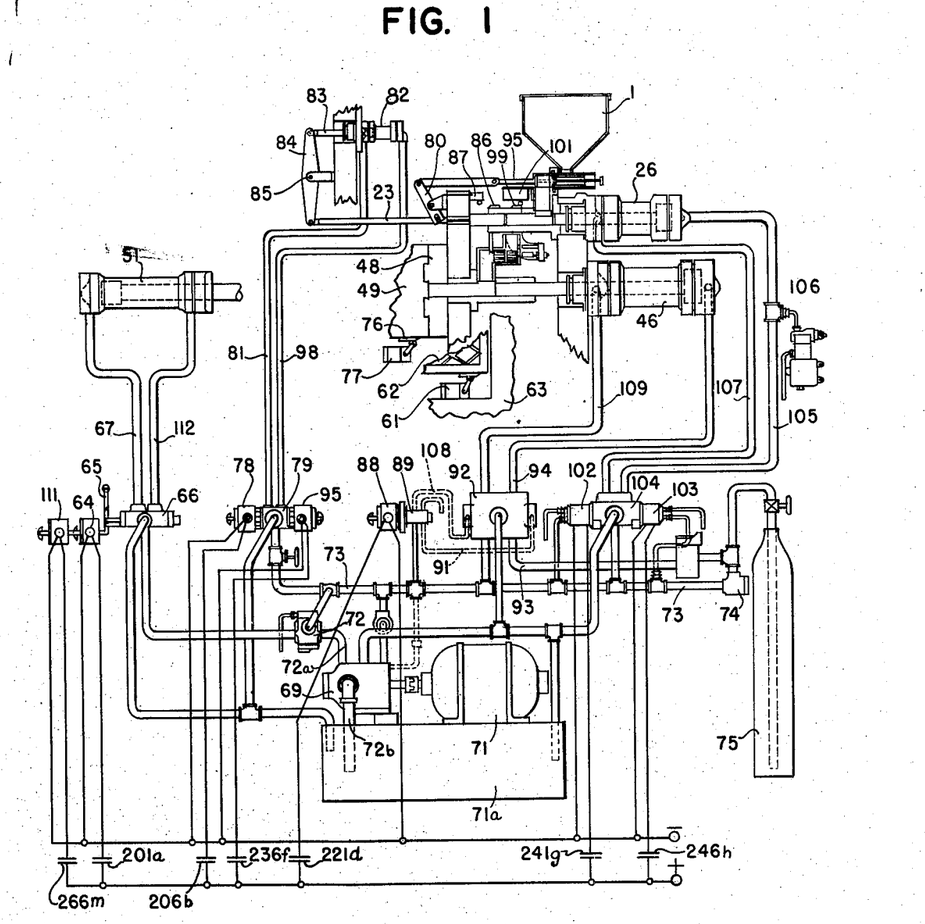
Fig. 1 is a schematic layout of the apparatus and control system therefor.
Figure 3:
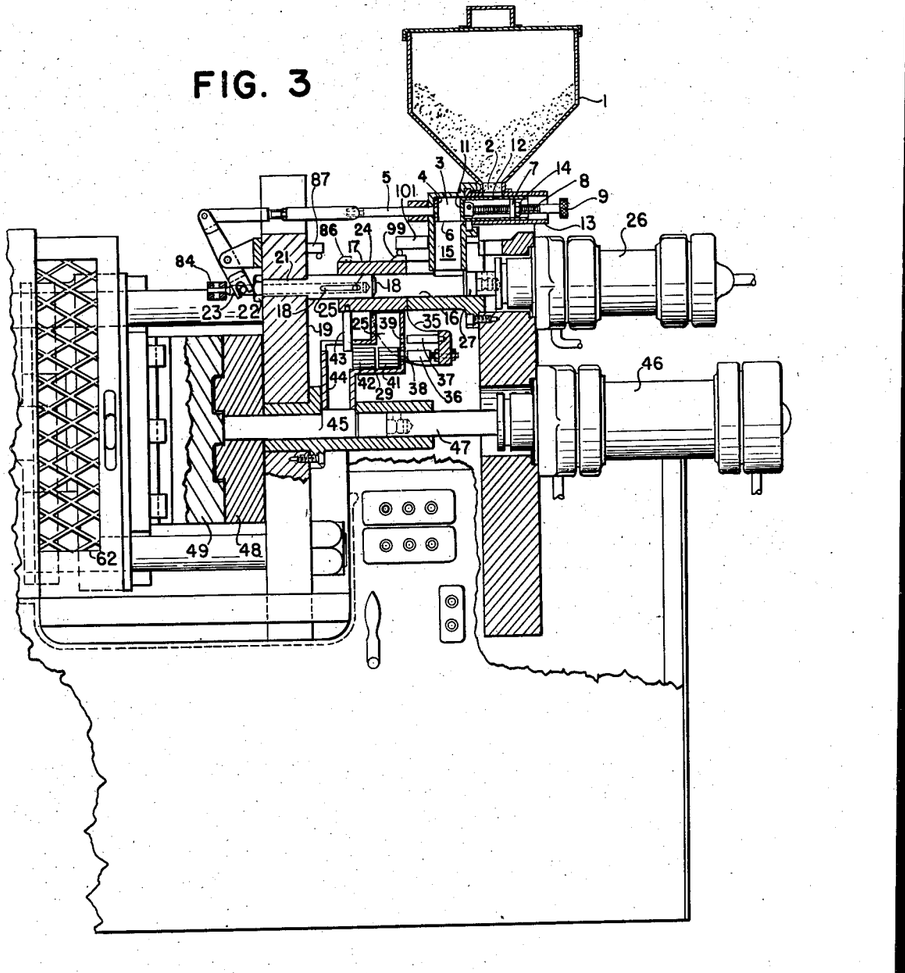
Fig. 3 is an enlarged sectional view of a portion of the same apparatus.

Referring now to the drawing and particularly Figs. 1 and 3, a hopper 1 retains a supply of the plastic material in powdered form. Immediately below the port 2 of the hopper is a tubular chamber 3 of square cross section in which is positioned the measuring device. This includes a reciprocable member having a head plate 4 to which a shaft 5 is secured.

Referring to Fig. 3, a pair of side plates, one of which such as 6 is shown, extend toward the open end of the chamber 3 and carry between them at a fixed position a partition 7 through which extends a threaded shaft 8 having a knurled nut 9 on the end thereof. The forward end of the shaft 9 is rotatably secured to a movable partition 11, which has formed integrally therewith a top plate 12 and a bottom plate 13, these plates being adapted to slide against the top and bottom of the elongated chamber 3. By adjusting the shaft 8 and its threaded connection with the partition 7 and locking it with the lock nut 14, the operator may thus vary the space between the partition 11 and the head plate 4 so that later when the plunger 5 moves the measuring device toward the right, as viewed in Fig. 3, until the open space between plates 4 and 11 uncovers the port 2 in the hopper, the amount of space between these two vertical plates will, obviously, determine the amount of plastic material which may fall down into the measuring chamber. Subsequently, when the shaft 5 restores the measuring device to the position shown in Fig. 3, the hopper port will be closed by top plate 12, and the measured charge of plastic material will be moved to the left and dropped downwardly through the tubular chute 15.

Without reference for the present to the control system which regulates the sequence of operations, the preforming and preheating of the plastic material will now be described. The measured charge dropping through the chute 15 falls into a cylindrical chamber 16 which is axially aligned with a stripper chamber 17, the latter being slidably positioned upon a cylindrical anvil 18 which abuts a heavy wall 19 and is anchored therein by a reduced portion 21 of the anvil extending through the wall 19 and being locked therein at the opposite side by a nut 22. The stripper 17 may be slid along the anvil 18 toward the left (Fig. 3) by means of rod 23 which extends into the hollow interior of the anvil and is connected with the stripper chamber by a pin 24 extending through the rod, through a slot 25 in the anvil and thence into the stripper.

A preform pressure cylinder 26, in which reciprocates a double acting piston (not shown), connected with the hydraulic pressure supply, serves to propel a preform piston rod 27, at the proper time, toward the left (Fig. 3) in the chamber 16 to force the measured charge of plastic material against the anvil 18 thus compressing it to a preformed cylindrical pellet having sufficient internal cohesion to retain its form thereafter.

Immediately below the position where the pellet is preformed is a chute 28 leading to a preheating chamber 29 into which the pellet drops as the rod 23, in the sequence of operations draws the stripper cylinder 17 toward the left.

Figure 6:
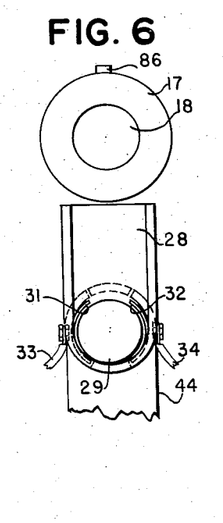
Fig. 6 is a partial sectional view on a plane through the line A—A of Fig. 2.
Figure 7:
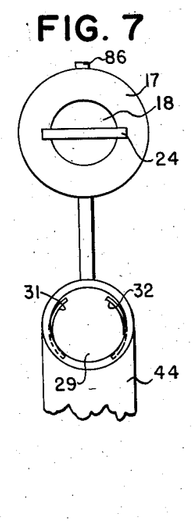
Fig. 7 is a partial sectional view on a vertical plane through the line B—B of Fig. 2.

On opposite sides of the preheating chamber, as shown in Fig. 6, is arranged a pair of plates 31 and 32 to which are connected cables 33 and 34 leading from a source of high frequency current used for the heating of the pellet. The curved plates 31 and 32 are arranged in relation to the diameter of the pellet so that they are in close proximity, though not usually in actual contact with the pellet, thus allowing for a slight expansion of the pellet which may be expected during its preheating. Whether the heating plates be in actual contact and resiliently mounted, or slightly spaced, makes little difference as in any event the relation of the plates to the pellet will be sufficient to assure passage of the high frequency current through the pellet.

As indicated in Fig. 3, there is attached to the stripper cylinder 17 a bracket 35 carrying a pair of pins 36 and 37 which will extend through the associated ports 38 and 39, the upper pin 37 serving to catch a preformed pellet when it drops down from the stripper cylinder and hold it momentarily in the chute 28 while the lower pin 36 is pushing a pellet such as 41 into the position occupied by a preheated pellet 42, as illustrated. The restoral of the stripper cylinder to the position shown in Fig. 3 will withdraw the two pins, permitting the preformed pellet to fall into the bottom of the preheating chamber. Another stop pin 43 carried by the stripper cylinder will serve to retain one preheated pellet at the position occupied by pellet 42 until the movement of the stripper cylinder to the left enables one pellet 41 to push the other 42 out into the chute 44 to fall into the injection cylinder 45.

Figure 2:
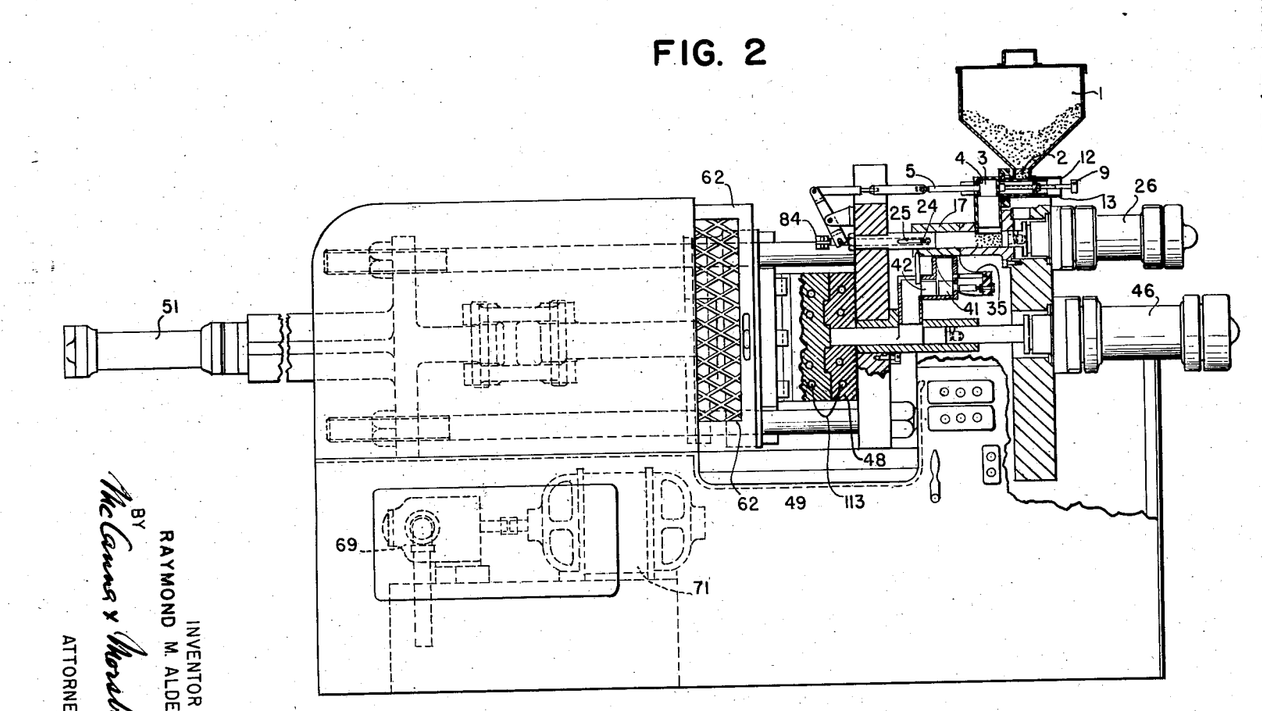
Fig. 2 is a view partly in section showing the principal operative portions of the measuring, preforming, preheating, and molding apparatus.

An injection pressure cylinder 46 is provided as shown particularly in Figs. 1, 2, and 3, and in which reciprocates a double acting piston (not shown) secured to a piston rod 47 which is employed to inject a preheated pellet of plastic material into a closed die consisting of a stationary die 48 and a movable die 49. As will be explained later, the initial movement of the piston rod 47 in carrying the pellet up to the position of the one or more gates leading into the die will be a rapid movement and thereafter during the forcing of the pellet into the die the piston moves more slowly but with greater pressure to fill the mold cavities and to hold the pressure thereon until the plastic material has set.

Figure 4:
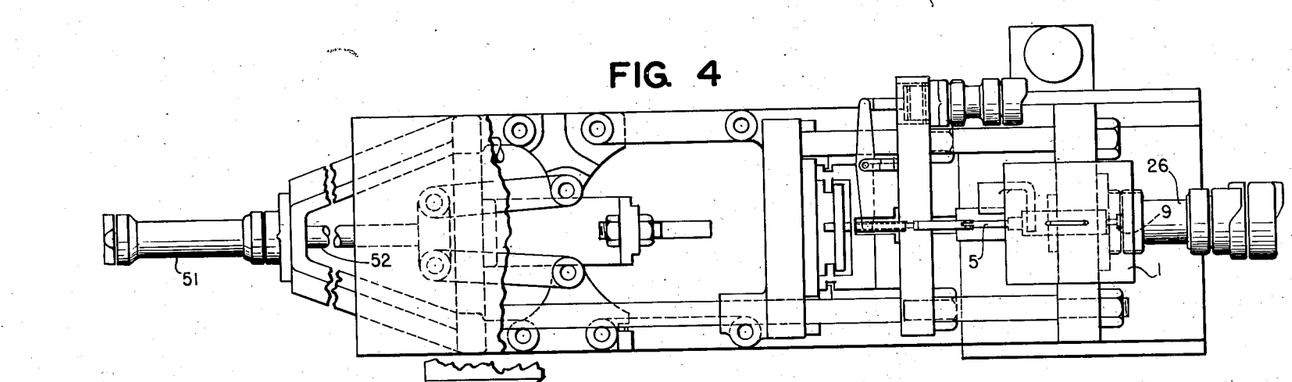
Fig. 4 is a top plan view of the machine.
Figure 5:
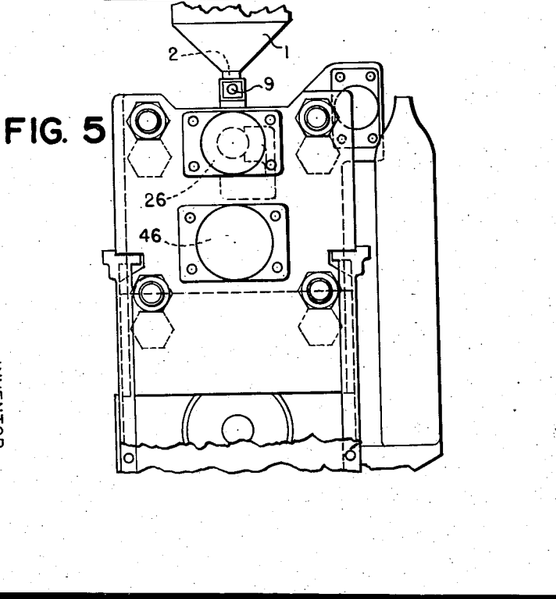
Fig. 5 is an end elevation of the machine as viewed from the right hand end of Fig. 4.

After the setting of the material in the mold cavities, either as a result of the normal action of thermosetting materials, or as the result of cooling provided in the dies for thermoplastic materials, the die will be opened and the molded product stripped therefrom by any conventional stripping means whether mechanical or pneumatic. Figs. 2 and 4 show the location of the die closing pressure cylinder 51 and the piston rod 52, which is hydraulically operated thereby and the location of a toggle mechanism which is employed for closing and locking the die closed. This invention is not concerned with the details of construction of the die, or the mold cavities therein, or the mold closing or locking mechanism employed. Any suitable and well-known mechanism for such parts may be employed.

The electrically controlled hydraulic system for operating the molding apparatus will now be described, reference being had now more particularly to Figs. 1 and 2. It will be assumed that the machine has already been in operation and that a preheated pellet 42 is lying in the left end of the preheating chamber 29, in contact with the plates 31 and 32, which do not extend into the right end of the preheating chamber (Fig. 3). Assume further that when the machine was started the operator had closed the switch 61 (Fig. 1), which may be any manually controlled switch, but which preferably is a limit switch operated by closing a safety gate indicated as 62 covering the closing position of the die.

As the gate closes against an adjacent portion 63 of the machine housing, switch 61 operates and energizes a pull type solenoid 64, which is attached to the starting lever 65 by means of which the four way valve 66 may, if desired, be manually operated instead of being operated by the solenoid. This operation of valve 66 will direct oil into pipe line 67 to the head end of the die closing cylinder 51.

The pump 69 may be any one of several well-known double pump units consisting of a large volume low pressure pump and a small volume high pressure pump, both continuously driven by a motor 71.

During the initial closing movement of the die the delivery of both pumps is directed to the head end of the cylinder, rapidly closing the die. As the die closing piston arrives toward the end of its stroke, pressure will build up in the cylinder 51, unloading the large volume low pressure pump and allowing the small volume high pressure pump, in a well-known manner, to continue to deliver oil to the cylinder until maximum pressure is reached when the die is closed, at which time oil will be by-passed over the sequence valve 72 through line 73 and check valve 74 to an accumulator tank 75.

When the movable die 49 has reached the forward end of its stroke an adjustable cam member 76 carried thereby will contact limit switch 77, energizing solenoid 78 to operate the four way valve 79, to direct oil through line 81 to the rod end of cylinder 82, causing piston rod 83 to move toward the right from the position shown in Fig. 1. The rocker arm 84, pivotally mounted between its ends at 85 will draw rod 23 toward the left causing the measuring device to move to the right under the hopper to receive a new charge.

Figs. 1 and 3 indicate clearly how the movement of rod 23 by rocker arm 84 also causes the reciprocation of rod 5 by means of rocker arm 80, whose lower bifurcated end engages a pin carried by rod 23.

The same operation of cylinder 82 and rod 23 will move the stripper cylinder 17 to the left to allow a preformed pellet contained therein to fall into chute 28 where it is stopped part way down by pin 37 which will at that instant extend into the chute. Since the stripper cylinder and bracket 35 move integrally the ejector pin 36 will push a preform such as 41 toward the left displacing the preheated preform 42, dropping the latter into the chute 44 and chamber 45 in front of the injector piston 47.

When the piston in cylinder 82 reaches the right hand end of its travel an adjustable dog 86 mounted on the stripper cylinder will contact a limit switch 87 to energize solenoid 88 which operates the four way pilot valve 89, to direct pilot pressure through line 91 to the right hand side of the pilot operated double pressure four way valve 92, to shift this valve. When valve 92 is thus shifted, oil will be directed from the accumulator tank through line 93, through valve 92 and line 94 to the head end of injector cylinder 46, to propel piston 47 rapidly forward to force a preheated preform toward and into the die.

The actuation of limit switch 87 by the dog 86 also performs other functions. Not only does it energize solenoid 88, but it also deenergizes solenoid 78 on valve 79, energizes solenoid 95 on valve 79, starts the curing timer 96 and starts the preheating timer 97.

The energizing of solenoid 95 will shift the four way valve 79 to cause the pump delivery to be directed through line 98 to the head end of cylinder 82 to restore rod 83 to its starting position, thus moving the measuring device to the left, as shown in Figs. 1, 2, and 3, to drop the measured charge into chute 15 ahead of the preform piston 27.

This same movement of rod 83 will return the stripper 17 to the position shown in Figs. 1, 2, and 3, which will allow a preformed pellet to drop to the bottom of chute 28.

As above described, the actuation of the limit switch 87, having caused the reversal of the four way valve 79, which returns the stripper 17 to the position shown in Fig. 1, thereby enables an adjustable dog 99 carried by the stripper to actuate a limit switch 101. When this switch operates it deenergizes solenoid 102 and energizes solenoid 103, both on four way valve 104, to shift the valve, directing the delivery of the pump unit through line 105 to the head end of the pellet preform molding cylinder 26, whereupon piston 27 (Fig. 3) will proceed to compress the measured charge of plastic material against the anvil 18 within the stripper cylinder 17 to make the preformed pellet. When a predetermined compression pressure of the pellet is attained, a pressure operated switch 106, of any desired construction (Fig. 1), will be actuated to deenergize solenoid 103 and energize solenoid 102 to shift valve 104 to direct oil through line 107 to return the preform piston to its starting position.

The curing timer 96, which may be of any construction suitable for the purpose, controls the length of time the plastic material is to be kept in the die under pressure of the injection piston and subject to such temperature as may be necessary to bring about the setting of the plastic. When the timer has measured off the prescribed interval it will deenergize solenoid 88 of pilot valve 89, to direct the pilot pressure to the left hand side of valve 92 through line 108 (Fig. 1), reversing this valve and directing delivery of the oil from the pump through line 109 to the rod end of cylinder 46 to return the injection piston to its starting position. The curing timer, simultaneously, at the end of the curing period, will energize solenoid 111, thus shifting valve 66, to direct oil through line 112 to the die closing cylinder to move its piston to the left and open the die.

As stated before, the piston for injecting a preheated pellet into the closed dies moves rapidly toward the dies in the initial part of its movement, but during the process of forcing the plastic material into the die its travel is slowed down, as the pressure builds up. Initially the large volume low pressure pump causes the rapid movement of the piston, but when a predetermined pressure resisting the piston movement is reached oil will be by-passed over the sequence valve 72 to the accumulator tank while the small volume high pressure pump will complete the forward movement of the piston and hold it during the curing interval at high pressure.

The sequence in the movement of the plastic material from the hopper to the dies has been described. This sequence is in fact so regulated that during the curing interval the preliminary steps in the sequential treatment of another pellet will occur so that as soon as the injection piston is withdrawn to the right hand end of its travel the next pellet has been preheated and is ready to drop instantly down in front of the injection piston. Accordingly the rapidity with which products may be molded in the dies and discharged therefrom with my invention is directly related to the length of the curing period. Whereas under ordinary compression molding methods the molding cycle might range from five to six minutes, the molding cycle for products made in accordance with this invention will usually be in the neighborhood of about two minutes or less, variations of this time interval being necessarily related to the size and character of the product being molded.

In Fig. 2 of the drawings I have indicated the location of pipes such as 113 in the two halves of the die through which a heating fluid may be circulated, or an electric heating element applied, where in the case of thermosetting materials it is necessary to maintain a certain die temperature to prevent premature setting of the thermosetting plastics before they have been completely injected into the mold cavities. Where thermoplastic materials are being molded by this machine these same pipes may be employed for circulating a cooling fluid to promote the quick setting of the thermoplastic material.

It should now be apparent that in accordance with this invention the molding material in the form of a pellet may be preheated and promptly injected into the dies while in a soft plastic condition so that it may readily flow into all the cavities of the mold to form completely accurate molded products and without any possibility of damaging or dislocating core pins. The rapidity of molding possible with this invention should be apparent. The uniformity of the products is assured by uniform preheating of each pellet and its injection while in a flowable condition.

The high frequency electric heating here provided will employ whatever frequencies are advisable for any particular material being treated. As a general example, these frequencies may vary and will often range between 1,000,000 and 15,000,000 cycles per second, but other frequencies, if desirable, may be employed. The wall structure of the preheating chamber will preferably be formed of a non-conducting, non-metallic material such as ceramic materials, both for the purpose of insulation and to prevent stray electrical fields.

As shown in Fig. 2 of the drawings, the two die parts 48 and 49 are respectively provided with liquid circulating passages 113 through which heating and cooling fluids may be circulated for the purpose of controlling the temperature of the two die parts. Thus, in the case where thermosetting materials are being cured in the die, it is necessary to maintain a certain die temperature in order to prevent premature setting of the thermosetting plastic material before it has been completely injected into the mold cavities of the die. The same conduits which interconnect the passages 113 with a source of heating fluid may also be used to direct a cooling fluid through these passages in order to promote the quick setting of moldable thermal setting plastic materials.

From the following detailed explanation, it will be apparent that in accordance with the present invention, the molding material in the form of a pellet is preheated and promptly injected into the die molding cavities while in a soft plastic condition, so that it may readily flow into all portions of the mold cavities to form completely accurate products without any possibility of damaging or dislocating core pins. The speed of molding which is obtained by practicing the present invention will be apparent from the following detailed explanation as to the mode of operation of the equipment. Preheating of the pellets is effected through operation of a high frequency generator 282 illustrated in Fig. 8 of the drawings as having its output terminals connected to the two plate electrodes 31 and 32. This generator may have an output frequency ranging from 1 to 30 megacycles per second, or higher. Preferably, the wall structure of the preheating chamber in which the electrodes 31 and 32 are disposed is formed of a nonconducting, nonmetallic material, such as a ceramic, both for the purpose of insulating the electrodes one from the other, and for the additional purpose of minimizing stray electric fields.

Figure 8:
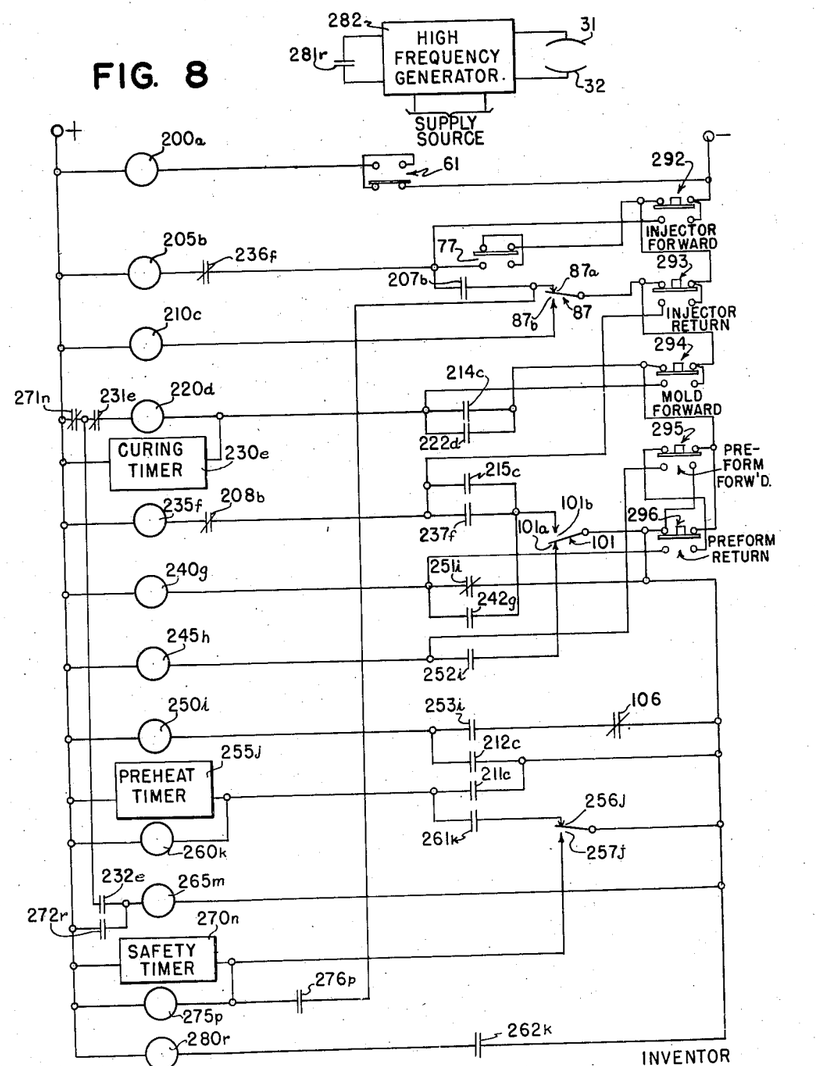
Fig. 8 is a schematic drawing of the electrical control system used in the machine.

Referring now more particularly to Figs. 1 and 8 of the drawings, the electro-hydraulic control system for selectively actuating the several double acting piston assemblies 26, 46, 51 and 82 is there illustrated. In brief, the hydraulic facilities of this system comprise a plurality of double acting solenoid operated valves 66, 79 and 104 individually associated with the piston assemblies 51, 82 and 26 and arranged selectively to direct fluid pressure against the front and back ends of the pistons within these assemblies, and a spring biased, single acting, solenoid operated pilot valve assembly 89 arranged selectively to control a valve 92 in directing fluid pressure against the front and back ends of the injector piston forming a part of the piston assembly 46. Each of the valves 66, 79 and 104 is so constructed that when operated to one setting through energization of one of its solenoids, it remains in that setting independently of its operating solenoids until its other solenoid is energized. Suitable conduits, specifically referred to below, are used to interconnect the described solenoid actuating valves with their respectively associated piston assemblies and with two sources of hydraulic fluid pressure, i. e., a compound pump unit 69 and an accumulator tank 75. The pump unit 69 is arranged to be driven by a continuously operated motor 71 and comprises a large volume low pressure pump and a small volume high pressure pump arranged to deliver liquid to a common outlet conduit 72a and having a common inlet 72b immersed in a supply tank 71a. Several well known types of pump units of this character are commercially available. The hydraulic liquid within the accumulator tank 75 is normally maintained at a high pressure by the delivery of liquid thereto from the compound pump 69 over a path which includes the sequence valve 72 and the header 73. Such charging of the accumulator tank 75 only occurs when the die closing piston of the assembly 51 occupies its die closing setting in the manner more fully described below.

The electrical facilities of the control system comprise two solenoids 64 and 11 individual to the double acting valve 66, a pair of solenoids 78 and 95 individual to the double acting valve 79, a single solenoid 88 associated with the pilot valve 89, and a pair of solenoids 102 and 103 associated with the double acting valve 104. These solenoids are arranged for selective energization and deenergization in the proper sequence under the control of the twelve relays, the coils of which are illustrated to the left of Fig. 8 of the drawings. These relays, in turn, are arranged for selective control by means of limit switches 61, 77, 87 and 101, which are operated in proper sequence by the moving parts of the apparatus and are illustrated both in Figs. 1 and 8 of the drawings. Each of the limit switches 61 and 77 is of the type wherein, when its operating arm is actuated, a circuit is momentarily closed therethrough (one second interval) after which the circuit is opened, and when its operating arm is released, the contacts are restored to normal without reclosing the circuit through the switch. The other two limit switches are of the conventional circuit transfer type. Further control of the relay network is obtained through the provision of a fluid pressure switch 106 operatively associated with the fluid conduit 105 leading to the head end of the piston assembly 26, and three motor driven rotary timers 285, 290 and 300. Each of the timers is spring biased to return to normal when the operating circuit for its driving motor is interrupted. Additional control facilities comprise the five manually operable switches 292 to 296 inclusive, which are provided for manually controlling the energization of the control relays on a selective basis. A direct current source, not shown, is employed for energizing the coils of the illustrated relays and solenoids, those circuit terminals which are identified by the negative polarity sign being connected to the negative terminal of this source, while those terminals identified by the positive polarity sign are connected to the positive terminal of the source.

In considering the operation of the apparatus and more particularly the control system, the operations resulting from closure of the start or limit switch 61 will be considered in the exact sequence in which they occur, but in order to avoid repetition of the description, it will be assumed that after this switch is closed an operating cycle is in progress which occurs substantially later than the first cycle resulting from operation of this switch. It is specifically noted that the switch 61 may be a manually controlled start switch, but preferably it is a limit switch which is automatically actuated to its closed circuit position when the safety gate 62 is closed. It is also specifically noted that the relay 240g is normally energized in a circuit which includes the contacts 251i and the upper contacts of the switches 296, 294, 293 and 292. With this relay energized, the solenoid 102 is normally energized through the contacts 241g, such that the valve 104 occupies a setting wherein fluid pressure is directed to the retracting end of the piston assembly 26 over a path which includes the conduit 107, this fluid pressure being derived from the accumulator tank 75 through the header 73.

When the limit switch 61 is actuated to start the apparatus, a circuit is momentarily completed through the upper and lower contacts of this switch for energizing the start relay 200a. In operating, this relay closes its contacts 201a to complete an obvious circuit for energizing the solenoid 64. This solenoid, in operating, shifts the valve 66 so that hydraulic pressure derived from the pump 69 is directed from the sequence valve 72 to the head end of the piston assembly 51 through the conduit 67. Shortly after the valve 66 shifts into the described new setting, the limit switch 61 opens the circuit between its lower contacts, thereby to deenergize the relay 200a. In releasing, this relay opens its contacts 201a to deenergize the solenoid 64.

When hydraulic pressure is thus directed against the head end of the piston within the assembly 51, the die part 49 is actuated to close against the stationary die part 48. During the initial closing movement of the die part 49, the delivery of both pumps of the unit 69 is directed to the head end of the piston assembly 51. As the die part 49 approaches the end of its stroke, pressure will build up in the cylinder of the assembly 51, thereby to unload the large volume low pressure pump of the pump unit 69 and thus allow the small volume, high pressure pump of this unit to continue the delivery of hydraulic fluid to this cylinder. Thus full closure of the die part 49 against the stationary die part 48 is effected. When the pressure within the cylinder of the assembly 51 builds up to a predetermined value, the sequence valve 72 operates to direct the output from the high pressure pump of the unit 69 to the header 73 for delivery to the accumulator tank 75.

Incident to the final closing movement of the die part 49, the adjustable dog 76 carried thereby engages the operating arm of the limit switch 77, thereby to operate this switch to its closed circuit position wherein a circuit is completed through the upper contacts of the switch 292 for energizing the relay 205b.

In operating, the relay 205b locks up in a circuit which includes the contacts 236f, 207b and 87a, and the upper contacts of the two switches 293 and 292. At its contacts 208b, the relay 205b opens a point in the operating circuit for the relay 235f. At its contacts 206b, the relay 205b completes an obvious circuit for energizing the solenoid 78 of the valve 79. Shortly after the relay 205b operates to perform the above described functions, the limit switch opens the circuit between its lower contacts, thereby to interrupt the operating circuit for the relay 205b. When the solenoid 78 is energized, the valve 79 is operated to direct hydraulic fluid from the header 73 to the left end of the piston assembly 82 over a path which includes the conduit 81. The fluid pressure thus directed against the left end of the piston in this assembly causes the piston rod 83 to be moved to the right from the position shown in Fig. 1 of the drawings, thereby to pivot the rocker arm 85 in a direction to draw the connecting rod 23 to the left. Movement of this rod to the left is translated into movement of the measuring device to the right to a position wherein the measuring chamber is in registry with the outlet port 2 of the hopper 1. Such movement of the measuring device is effected through a linkage connection, comprising the rod 5 and the rocker arm 84, which connects the measuring device with the rod 23. The same movement of the rod 23 to the left results in movement of the stripper cylinder 17 to the left to allow a preformed pellet of plastic material contained therein to fall into the chute 28. Movement of this pellet through the chute is, however, arrested before the pellet reaches the lower end of the chute by means of the stop pin 37 which projects into the chute. Since the stripper cylinder 17 and the bracket 35 move in unison, the ejector pin 36 will also act to push a preformed pellet, such as that indicated at 41, toward the left to displace the preheated pellet 42 from between the electrodes 31 and 32. The displaced pellet 42 is obviously pushed into the chute 44 to fall into the chamber 45 ahead of the injector piston 47.

As the stripper cylinder 17 is moved to the left from its normal position, an adjustable dog 99 carried thereby is moved out of engagement with the actuating arm of the limit switch 101 thus permitting the contacts 101a of this switch to be opened and the contacts 101b of this switch to be closed. At the contacts 101a, a point is opened in the operating circuit for the relay 245h. At the contacts 101b, a point is prepared in the operating circuit for the relay 235f and a locking circuit is prepared for the relay 240g.

As the rod 23 reaches the end of its travel to the left, an adjustable dog 86 carried by the stripper cylinder 17 engages the actuating arm of the limit switch 87 to operate this switch to a position wherein the contacts 87a are open and the contacts 87b are closed. At the contacts 87a, the above traced locking circuit for the relay 205b is interrupted. At the contacts 87b, a circuit is completed through the upper contacts of the switches 293 and 292 for energizing the relay 210c.

In operating, the relay 210c closes its contacts 211c to complete a circuit through the upper contacts of the switches 296, 294, 293 and 292 for energizing the relay 260k and the operating motor of the preheat timer 255j in parallel. At its contacts 212c, the relay 210c completes an obvious circuit for energizing the relay 250i. At its contacts 214c, the relay 210c completes a circuit through the upper contacts of the switches 294, 293 and 292 for energizing the relay 220d and the driving motor of the curing timer 230e in parallel. At its contacts 215c, the relay 210c prepares the operating circuit for the relay 235f. Thus, it will be apparent that the relay 210, in operating, effects the release of the relay 205b and the operation of the relays 220d, 250i, 260k, and initiates operation of the two timers 230e and 255j.

In operating, the relay 260k closes its contacts 261k to complete a locking circuit through the timer contacts 256j for itself and the motor of the timer 255j. At its contacts 262k, the relay 260k completes an obvious circuit for energizing the generator start relay 280r. The latter relay, upon operating, closes its contact 281r to initiate operation of the high frequency generator 282. As indicated above, this generator is preferably of the electron tube type, having an output frequency ranging from 1 to 30 megacycles or higher, and having its output terminals connected to the electrode plates 31 and 32 to produce a high frequency electric field therebetween. This field acts in a well-known manner rapidly and uniformly to heat the dielectric plastic pellet 41 forced between the electrodes 31 and 32 by the plunger 36.

The relay 250i, upon operating, opens its contacts 251i to interrupt the operating circuit for the relay 240g, but the latter relay remains energized through its locking contacts 242g. At its contacts 252i, the relay 250i prepares the operating circuit for the relay 245h. At its contacts 253i, the relay 250i locks up through the contacts of the pressure switch 106.

As indicated above, the relay 220d is energized incident to operation of the relay 210c. Upon operating, the relay 220d closes its contacts 222d to shunt the contacts 214c and thus complete a locking circuit for itself and the driving motor of the curing timer 230e. At its contacts 221d, the relay 220d completes an obvious circuit for energizing the solenoid 88. This solenoid, in operating, shifts the pilot valve 89 to direct fluid pressure through the line 91 to the right end of the four-way valve 92. This fluid pressure serves to shift the valve 92 so that hydraulic fluid is directed from the accumulator tank 75 through the conduits 93 and 94 to the head end of the piston assembly 46, thus causing the injector piston 47 to be rapidly moved forward to force the preheated preform 42 toward and into the mold cavity between the die parts 48 and 49.

The relay 205b, in releasing, opens its contacts 206b to deenergize the solenoid 78. At its contacts 207b, the relay 205b opens another point in its own locking circuit. At its contacts 208b, the relay 205b completes the prepared operating circuit for the relay 235f, this circuit including the contacts 215c and 101b, and the upper contacts of the switches 296, 294, 293 and 292.

In operation, the relay 235f closes its contacts 237f in shunt with the contacts 215c and thus completes a locking circuit for itself. At its contacts 236f the relay 235f closes an obvious circuit for energizing the solenoid 95. When the solenoids 95 and 78 are thus energized and deenergized, respectively, the valve 79 is shifted to release the pressure built up against the left end of the piston in the assembly 82 through the conduit 81, and to direct hydraulic fluid against the right end of this piston through the conduit 98. Thus, the piston rod 83 is actuated to move the rod 23, the stripper cylinder 17, the carriage 35 and the plastic measuring device back to their respective normal positions. As the carriage 35 is moved to the right, to its normal position, the plungers 36 and 37 are withdrawn from the chute 28, permitting the preformed plastic pellet to fall to the bottom of the chute. As the measuring device is moved to the left back to its normal position, the outlet port 2 of the hopper 1 is closed and the charge of powdered plastic material held in the measuring device is discharged into the compression chamber 16.

Incident to the initial movement of the stripper cylinder 17 back to its normal position, the dog 86 is disengaged from the actuating arm of the limit switch 87, thus permitting the contacts 87b to open and the contacts 87a to close. When the contacts 87b are opened, the relay 210 is deenergized and restores. When the contacts 87a are closed, locking circuits for the relays 205b and 275p are reprepared. In releasing, the relay 210c opens its contacts 211c, 212c, 214c and 215c to interrupt the operating circuits for the relays 260k, 250i, 220d and 235f, but all of these relays are held operated and the motors of the timers 230e and 255j are held energized over their previously described locking circuits.

As the stripper cylinder 17 is moved into its home position, the dog 99 shifts the setting of the limit switch 101 to open the contacts 101b and reclose the contacts 101a. When the contacts 101b are opened, the relays 235f and 240g are deenergized and restore. When the contacts 101a are closed, a circuit is completed through the contacts 252i and the upper contacts of the switches 296, 294, 293 and 292 for energizing the relay 245h.

In releasing, the relay 235f opens its contacts 236f to deenergize the solenoid 95. At its contacts 237f, the relay 235f opens a point in its own locking circuit. The relay 240g, upon restoring, opens its contacts 241g to deenergize the solenoid 102. At its contacts 242g, the relay 240g opens a point in its own locking circuit. The relay 245h, in operating, closes its contacts 246h to complete an obvious circuit for energizing the solenoid 103.

When the solenoids 102 and 103 are deenergized and energized, respectively, the valve 104 is shifted to a setting wherein the hydraulic pressure normally directed to the left end of the piston assembly 26 is relieved, and hydraulic pressure is directed to the right end of this assembly through the conduit 105. As a result, the compression piston 27 is rapidly moved to the left to compress the measured charge of plastic powder into pellet form against the end of the anvil 18 and the internal walls of the stripper cylinder 17.

When a predetermined pressure is built up in the conduit 105, sufficient to insure adequate compression of the powdered plastic material into pellet form, the pressure switch 106 is operated and opens its contacts to deenergize the relay 250i. This relay, in releasing, opens its contacts 252i to deenergize the relay 245h. At its contacts 253i, the relay 250i opens another point in its own locking circuit. At its contacts 251i, the relay 250i recompletes the operating circuit for the relay 240g. In releasing, the relay 245h opens its contacts 246h to deenergize the solenoid 103. Upon reopening, the relay 240g closes its contacts 241g to again energize the solenoid 102. At its contacts 242g, the relay 240g reprepares its own locking circuit.

When the solenoid 103 is deenergized and the solenoid 102 is reenergized in the manner just explained, the setting of the valve 104 is shifted to relieve the hydraulic pressure at the right end of the piston assembly 26 and to build up hydraulic pressure at the left end of this assembly. As a result, the compression piston 27 is rapidly retracted to its home position. Also, release of the pressure in the conduit 105 causes the pressure switch 106 to be automatically restored to normal wherein its contacts are closed to reprepare the locking circuit for the relay 250i.

After the above described operations are completed, the curing timer 230e continues to operate for the purpose of measuring the required curing interval. At the end of the measured time interval, the actuating element of this timer functions to open the normally closed contacts 231e and to close the normally open contacts 232e. At the contacts 231e, the previously traced operating and locking circuits for the relay 220d are interrupted. At the contacts 232e a circuit is completed through the contacts 271n for energizing the relay 265m. In releasing, the relay 220d opens its contacts 221d to deenergize the solenoid 88. At its contacts 222d, the relay 220d opens another point in its own locking circuit and deenergizes the driving motor for the curing timer 230e. The relay 265m, upon operating, closes its contacts 266m to complete an obvious circuit for energizing the solenoid 111.

When the solenoid 88 is thus deenergized, the setting of the valve 89 is so shifted that pilot pressure is removed from the right end of the valve 92 and is delivered to the left end of this valve over the conduit 108. In response to this operation, the valve 92 shifts its setting to relieve the hydraulic pressure directed to the right end of the piston assembly 46 and to direct hydraulic pressure to the left end of this assembly through the conduit 109. As a result of these operations, the injector piston is rapidly withdrawn to its home position. When the solenoid 111 is energized in the manner just explained, the setting of the valve 66 is shifted so that the hydraulic pressure being directed to the left end of the piston assembly 51 through the conduit 67 is relieved and hydraulic pressure is directed to the right end of this assembly over the conduit 112. In response to these operations, the piston within the assembly 51 is retracted to its home position to withdraw the removable die part 49 away from the stationary die part 48, wherein the molded article may be stripped out of the die part 48 either manually or automatically. During the initial movement of the die part 49 toward its home position, the dog 76 is disengaged from the actuating arm of the limit switch 77 thereby to return this limit switch to its normal setting without reclosing the circuit therethrough.

Immediately the driving motor of the curing timer 230e is deenergized in the manner explained above, the restoring spring of the timer starts to restore the timer to its normal setting. Incident to this operation and shortly after the solenoid 111 is energized, the timer contacts 232e are opened and the contacts 231e are closed. When the contacts 232e are opened, the relay 265m is deenergized. When the contacts 231e are reclosed, the operating circuit for the relay 220d is reprepared. In releasing, the relay 265m opens its contacts 266m to deenergize the solenoid 111.

After the above described operations are completed and when the preheat timer 255j completes its timing cycle, the contacts 256j thereof are opened and the contacts 257j are closed. At the contacts 256j, the relay 260k and the driving motor of the timer 255j are deenergized. Upon restoring, the relay 260k opens its contacts 261k further to interrupt the locking circuit for itself and the driving motor for the timer 255j. At its contacts 262k, the relay 260k deenergizes the generator start relay 280r. The latter relay, upon restoring, opens its contacts 281r to interrupt the start circuit for the high frequency generator 282 and thus arrest operation of this generator. Shortly after the described relay operations are completed, the timer 255j is actuated to its normal or home setting under the influence of its restoring spring, in preparation for a new operating cycle. As it is initially moved toward this setting, the contacts 256j thereof are reclosed and the contacts 257j thereof are opened. Thus the control equipment is restored to normal in preparation for a new operating cycle of the machine. To initiate this new cycle it is necessary for the machine operator to reoperate the switch 61 to its closed circuit position by manually opening and closing the gate 62.

As indicated above, the contacts 257j are momentarily closed by the timer 255j when this timer times out to terminate the pellet preheating. Closure of these contacts serves to initiate operation of the safety timer 270n having the function of preventing the preheated pellet from being injected into the mold cavity of the die parts after it has been allowed to cool for a predetermined time interval. This feature is provided in the control circuit to prevent a pellet which has been preheated and then allowed to set and harden from being forced into the mold cavity with resultant damage to the die parts.

Specifically, when the contacts 257j are closed by the timer 255j, the relay 275p and the driving motor for the timer 270n are energized in parallel over a circuit which includes the upper contacts of the switches 296, 294, 293 and 292. In operating, the relay 275 closes its contacts 276p to complete a locking circuit through the contacts 87a and the upper contacts of the switches 92 and 93 for itself and the driving motor of the timer 270n. Thus operation of the timer 270n is continued after the timer 255j opens its contacts 257j and restores to normal.

In the normal use of the machine, the safety timer 270n is not allowed to time out. On the contrary the operator should, under normal circumstances, recycle the machine long before the timer 270n completes its time measuring function. Shortly after the new operating cycle of the machine is started, the limit switch 87 is operated to open its contacts 87a, thereby to deenergize the relay 275p and the driving motor of the safety timer 270n. In releasing, the relay 275p opens its contacts 276p further to interrupt the locking circuit for itself and the driving motor of the timer 270n. When this motor is deenergized, the timer 270n is restored to normal under the influence of its restoring spring, without operation of the contacts 271n and 272n. Thus it will be understood that if the operating cycles of the machine follow each other with sufficient rapidity, the safety timer is not permitted to time out and hence performs no active function in the operation of the machine.

If on the other hand the machine operator fails to open and close the safety gate 62 to initiate a new operating cycle of the machine within the time interval measured by the safety timer 270n, this timer upon timing out, opens its contacts 271n to interrupt a common point in the operating and locking circuits for the relay 220d and a point in the above traced operating circuit for the relay 265m. At its contacts 272n, the timer 270n completes a circuit through the upper contacts of the switches 296, 294, 293 and 292 for energizing the relay 265m. This relay, in operating, closes its contacts 266m to energize the solenoid 111, whereby the die part 49 is locked in its open position. Thus, with this solenoid energized, operation of the gate switch 61 to produce sequential energization of the relay 200a and the solenoid 64 is without effect to shift the setting of the valve 66. Accordingly, the limit switches 77 and 87 cannot be operated to continue the operating cycle of the machine. If desired, the timer 270n may also be used in an obvious manner to control a signal device, such, for example, as a bell, to indicate that the cooled pellet in the channel 45 of the machine must be ejected before cyclic operation of the machine may be resumed.

In order to eject the cooled and hardened pellet from the channel 45 of the machine, it is necessary for the machine operator to actuate the injector forward switch 292. In response to this operation, the relay 275p is deenergized and a circuit is completed through the lower contacts of the switch 292 for energizing the relay 205b. The relay 275p, upon restoring, opens its contacts 276p further to interrupt the locking circuit for itself and the motor of the timer 270n. When this motor is thus deenergized, it opens its contacts 272 further to interrupt the alternative operating circuit for the relay 265m. At its contacts 271n the timer 270n reprepares the operating circuit for the relay 220d.

In operating, the relay 205b closes its contacts 207b to sustain the energization of the relay 275p and the driving motor of the safety timer 270n, and to prepare a locking circuit for itself. At its contacts 206b, the relay 205b energizes the solenoid 78 to shift the setting of the valve 79 so that the rod 23 is actuated to move the measuring device 3, the stripper cylinder 17, and the arm 35 to their respective forward positions in the manner previously explained. Concurrently with the operation of the switch 292 to perform the functions just described, the upper contacts of this switch are opened to prevent energization of any of the relays 210c, 220d, 235f, 245h, 250i, 260k, and 280r, to deenergize the relays 265m and 240g, and to prevent energization of the driving motors of the timer 230e and 255j. Thus the operation of the limit switches 101 and 87 which occurs incident to movement of the stripper cylinder 17 away from its normal position is without immediate effect. The release of the relay 240g is without effect. The relay 265m, in restoring, opens its contacts 266m to deenergize the solenoid 111 and thus permit the valve 66 to be shifted by the solenoid 64. When the switch 292 is released to open its lower contacts and reclose the circuit through its upper contacts, the relay 210c is immediately energized through the contacts 87b of the limit switch 87. Concurrently therewith, the relay 240g is reoperated and the relays 205b and 275p are deenergized and restore. In releasing, the relay 205b opens its contacts 206b to deenergize the solenoid 78. At its contacts 207b, the relay 205b opens another point in the locking circuit for the relay 275p and the driving motor of the safety timer 270n. When the relay 210c is energized, the control circuit is conditioned to cause the machine to continue the initiated operating cycle thereof in a manner which will be fully apparent from the preceeding explanation. Thus it will be noted that when the injector forward switch 292 is operated, an operating cycle of the machine is initiated which is complete except for the omission of the step of closing the die parts 49 and 48. Incident to operation of the injector piston 47 which occurs in this operating cycle the cooled pellet lying in the channel 45 of the machine is ejected through the open face of the die part 48 in an obvious manner. Thus, it will be apparent that the safety timer 270n coacts with the other circuit components of the control system to prevent a cooled and hardened pellet from being injected into the mold cavity of the die parts.

The manner in which the remaining four switches 293, 294, 295, and 296 may selectively be operated for the purpose of selectively controlling the different operating pistons of the machine will be substantially apparent from the preceding description. Thus, if it is desired to return the injector piston 47 to its normal setting, to interrupt a molding operation in progress during the interval when the curing timer 230e is timing out, the injector return switch 293 may be operated. In response to this operation, the upper contacts of the switch are opened to deenergize any energized ones of the circuit components shown in Fig. 8 of the drawings. At the lower contacts of the switch 293 a circuit is completed through the contacts 208b for energizing the relay 235f. This relay, in operating, closes its contacts 236f to energize the solenoid 95 and thus shift the setting of the valve 79 so that positioning of the rod 23 and the parts actuated thereby in their respective normal positions is assured following release of the switch 293. Incident to the release of the relay 220d, which occurs when the switch 293 is operated, the contacts 221d are opened to deenergize the solenoid 88 and thus shift the setting of the valve 92 to effect retraction of the piston 47 to its normal or home position. After the injector return switch 293 is released all parts of the circuit are at normal.

Again, if it is desired to operate the injector piston 47 forward, this may be accomplished by operating the mold forward switch 294 to effect direct energization of the relay 220d followed by energization of the solenoid 88. In this case also, those circuit components shown below the relay 220d in Fig. 8 of the drawings which may be energized at the time the switch 294 is operated are all deenergized in response to operation of this switch. The two switches 295 and 296 are provided for the purpose of selectively controlling the preform piston 27. Thus if the preform forward switch 295 is operated, the relay 245h is energized and closes its contacts 246h to energize the solenoid 103, thereby to operate the piston 27 forward in the manner explained above. On the other hand, if the preform return switch 296 is operated, a circuit is completed for energizing the relay 240g which relay, in operating, closes its contacts 241g to energize the solenoid 102, whereby the piston 27 is retracted to its some position. It will be noted that the two switches 295 and 296 are electrically interlocked so that only one of the two relays 240g and 245h may be energized therethrough at any given instant, thus preventing simultaneous energization of the two solenoids 102 and 103. It will also be understood that these two switches are normally not operated except under special circumstances when cyclic operation of the machine in the above described manner is not desired.

In the event fully automatic operation of the machine in a cyclic manner without operation intervention at the end of each operating cycle is desired, a simple on-off switch arranged to be closed and opened by the safety gate 62 may be serially included in the operating circuit for the relay 200a, and the limit switch 61 may be mechanically arranged for operation when the die part 49 is operated to its retracted or open setting at the end of each operating cycle of the machine. In such case, a circuit for energizing the relay 200a is momentarily closed through the contacts of the switch 61 each time the die parts are opened to complete a molding cycle. As an adjunct to this combination, it is also necessary to provide a self-restoring start switch connected in parallel with the switch 61 for independently closing the operating circuit for the relay 200a after the series connected gate switch is opened to terminate operation of the machine and then reclosed to recondition the machine for further operation. With this arrangement, momentary operation of the start switch paralleling the limit switch 61 is effective to initiate the operation on the machine, following which it continues to recycle itself in a manner which will be fully apparent from the preceding explanation.

From the above explanation it will be understood that the sequence of movements of the granular plastic material from the hopper to the dies is so regulated that during the curing interval required for curing one article, the preliminary steps in the sequential treatment of another pellet are concurrently effected. Thus immediately the injector piston is withdrawn to the right hand end of its travel, a pellet which has been preheated is ready to drop instantly down in front of the injector piston. The rapidity with which products may be molded in the dies and discharged therefrom is, therefore, directly related to the length of the curing period. Whereas with ordinary compression molding methods, the curing interval may range from 10 to 15 minutes, the curing interval for products made in accordance with this invention will usually be in the neighborhood of about one minute, variations of this time interval being necessarily related to the size of the product being molded.

While there has been described what is at present considered to be the preferred embodiment of the invention, it will be understood that various modifications may be made therein which are within the true spirit and scope of the invention as set forth in the appended claims.

I claim:

1. A cyclically operative plastic molding machine comprising, in combination, a molding die, pellet forming means for forming a pellet of plastic material, high frequency electric heating means for heating a pellet formed by said pellet forming means, means for injecting each preheated pellet into said molding die, control means, means responsive to operation of said control means for operating said injecting means to inject a preheated pellet into said molding die, means responsive to operation of said last-named means for operating said heating means to preheat a pellet for injection into said molding die during a later operating cycle of the machine, and means responsive to operation of said last-named means for operating said pellet forming means to form a pellet which is adapted to be preheated by said heating means and then injected into said molding die by said injecting means during two successively later operating cycles of said machine.

2. A plastic molding machine comprising relatively movable die parts having a mold cavity therebetween, means for opening and closing said die parts, means operated in timed sequence with the closing of said die parts for automatically injecting a charge of plastic material into said mold cavity each time said die parts are closed, high frequency electric heating means for preheating each charge of plastic material before it is injected into said mold cavity, means responsive to operation of said first-named means for initiating the operation of said heating means, and timing means operable to terminate operation of said heating means a predetermined time interval after operation thereof is initiated by said last-named means.

3. A plastic molding machine comprising relatively movable die parts having a mold cavity therebetween, means for opening and closing said die parts, means operated in timed sequence with the closing of said die parts for automatically injecting a charge of plastic material into said mold cavity each time said die parts are closed, high frequency electric heating means automatically controlled to preheat each prepared charge of plastic material before it is injected into said mold cavity, and means for preventing a charge of said plastic material which has been preheated and then allowed to cool below a predetermined temperature from being injected into said cavity.

4. A plastic molding machine comprising relatively movable die parts having a mold cavity therebetween, automatic means for opening and closing said dies, means for injecting a charge of plastic material into said mold cavity each time said die parts are closed, means automatically operated in timed sequence with the opening and closing of said die parts for preparing a charge of plastic material for injection into said cavity each time said die parts are closed, high frequency electric heating means adapted to be energized to preheat each prepared charge before it is injected into said mold cavity, and energization control means responsive to operation of one of the preceding-named means to energize said heating means for a predetermined time interval and then de-energize said heating means.

5. A plastic molding machine comprising relatively movable die parts having a mold cavity therebetween, automatic means for opening and closing said dies, means for injecting a charge of plastic material into said mold cavity each time said die parts are closed, means automatically operated in timed sequence with the opening and closing of said die parts for preparing a charge of plastic material for injection into said cavity each time said die parts are closed, high frequency electric heating means for preheating each prepared charge before it is injected into said cavity, and means for preventing a charge of said plastic material which has been preheated and then allowed to cool below a predetermined temperature from being injected into said cavity.

6. A unitary and cyclically operative plastic molding machine for thermosetting materials comprising means for measuring and delivering a measured charge of said material for a pellet forming operation, hydraulic propelled means for compressing each charge into a pellet, high frequency electrical heating means for preheating each pellet to a temperature just below its thermosetting temperature, a pair of die members and reversible hydraulic means for closing them prior to charging, reversible hydraulic means for injecting a preheated pellet into the closed die members, means for regulating the time of preheating of each pellet, curing timing means for regulating the duration of curing of each mold charge in the die members, and an electrically controlled valve system in part controlled by said curing timing means and in part sequenced by the other preceding named means for regulating the distribution of propelling and reversing hydraulic pressure fluids to each of said hydraulic means during each operating cycle of the machine.

7. In a machine for molding plastic thermosetting materials, means for preforming pellets of said plastic material, high frequency electrical heating means for preheating each pellet to a temperature range just below its thermosetting reaction temperature range, die members and means for closing them prior to charging, means for injecting a preheated pellet into the closed die members, and means for opening said die members at the end of each molding operation, and means for preventing reclosure of said die members in response to the lapse of a predetermined time period during which said die members stand open and which starts with termination of pellet preheating.

8. A plastic molding machine comprising stationary and movable die means, hydraulic means for moving the movable die means, a storage chamber for plastic materials, movable charge measuring means for receiving a measured quantity of material from said storage means, hydraulic means for moving the measuring means between filling and discharge positions thereof, hydraulic propelled means for compressing the measured charge of plastic material into a pellet, means defining a heating zone, means for discharging a preformed pellet to said heating zone, high frequency electrical means for heating said pellet while in said zone, means defining an injection chamber, means for transferring a pellet into said heating zone and for discharging it therefrom to said injection chamber, said injection chamber having communication with the closed dies, hydraulic means for injecting a preheated pellet from said chamber into said dies and for temporarily holding it there under pressure, a timer for controlling said heating means, a curing timer for regulating the duration of the curing of the plastic material in said dies, and electrically controlled valves for distributing and regulating the application of hydraulic pressure fluid to all of the foregoing hydraulic means.

9. A plastic molding machine comprising a die having a movable portion and hydraulic means for opening and closing said die portion, a supply hopper for plastic material, a measuring device for receiving, measuring, and transferring a measured charge of said material, hydraulic means for receiving and compressing into a preformed pellet said measured charge, means controlled by the compressing pressure of the preforming means for limiting its compression movement, high frequency electrical heating means for preheating nearly to thermosetting temperatures pellets preformed from thermosetting plastics, hydraulically propelled means for effecting transfer of a preformed pellet into said heating means and ejecting it therefrom, a single reversible hydraulic means for actuating said measuring device and pellet transfer means, reversible hydraulic means for injecting a preheated pellet into the dies when closed, a preheating timer for controlling the duration of the preheating of each pellet, a curing timer controlling the retention of each injected charge in the dies, a source of propelling and reversing fluid, valve means for distributing propelling and reversing pressure fluid from said source to each of said hydraulic means, and electrical means for controlling the shifting of said valves under control of said curing timer.

10. A plastic molding machine comprising a die and hydraulic means for opening and closing the same, a storage hopper for plastic material, an adjustable measuring device for receiving from the hopper for measuring a charge of plastic material and transferring it therefrom, hydraulic actuated means for receiving and compressing into a pellet said measured charge, high frequency electrical heating means for preheating said pellet to a plastic condition, pellet handling means for receiving the preformed pellet, for inserting it into said heating means and ejecting it therefrom, hydraulic means for propelling said measuring device and pellet handling means, hydraulic propelled means for injecting a preheated pellet into the dies when closed and for holding the plastic material under pressure therein until cured, electrical timing means for controlling the duration of said preheating, another electrical timing means for regulating the duration of the curing period and for controlling the discharge of the molded product from the dies, a common hydraulic fluid supply system for all of said hydraulic means, and electrically controlled valve means for automatically distributing in sequence the actuating pressure fluid to the means for operating the dies, the measuring device, the pellet forming mechanism, pellet handling means, and the injection means.

11. A plastic molding machine comprising dies and hydraulic means for opening and closing the same, a storage hopper for plastic material, an adjustable measuring device for receiving from the hopper for measuring a charge of plastic material and transferring it therefrom, hydraulic actuated means for receiving and compressing into a pellet said measured charge, high frequency electrical heating means for preheating said pellet to a plastic condition, pellet handling means for receiving the preformed pellet, for inserting it into said heating means and ejecting it therefrom, hydraulic means for propelling said measuring device and pellet handling means, hydraulic propelled means for injecting a preheated pellet into the dies when closed and for holding the plastic material under pressure therein until cured, electrical timing means for controlling the duration of said preheating, another electrical timing means for regulating the duration of the curing period and for controlling the discharge of the molded product from the dies, a common hydraulic fluid supply system for all of said hydraulic means, and means for locking said dies in an open position in response to the lapse of a predetermined time period during which said dies stand open and which starts with termination of pellet preheating.

12. A cyclically operative plastic molding machine comprising means defining a molding member, means for forming at least one measured charge of plastic material during each operating cycle of the machine, means for preheating each charge formed during one operating cycle of the machine during a succeeding operating cycle of the machine, means for transferring charges formed by said charge forming means to said charge heating means, means for injecting each charge preheating during one operating cycle of the machine into said molding chamber during the next succeeding operating cycle of the machine, control means, and means responsive to operation of said control means for effecting at least one complete operating cycle of the machine to produce sequenced operation of said preceding-named means in a predetermined order.

13. A cyclically operative plastic molding machine comprising manually operable means for initiating each machine operating cycle, relatively movable die parts having a molding chamber therebetween, means for closing and then opening said die parts during each operating cycle of the machine, means for forming a measured charge of plastic material into a pellet during each operating cycle of the machine, means for preheating during each operating cycle of the machine a pellet formed during a preceding operating cycle of the machine, means for injecting into said molding chamber during each operating cycle of the machine the pellet preheated during the preceding operating cycle of the machine, and time controlled means for locking said die parts open in response to the lapse of a predetermined time interval during which said die parts stand open and which starts with termination of each pellet preheating interval.

14. A cyclically operative plastic molding machine comprising manually operable means for initiating each machine operating cycle, relatively movable die parts having a molding chamber therebetween, means for closing and then opening said die parts during each operating cycle of the machine, means for forming a measured charge of plastic material into a pellet during each operating cycle of the machine, means for preheating during each operating cycle of the machine a pellet formed during a preceding operating cycle of the machine, means for injecting into said molding chamber during each operating cycle of the machine the pellet preheated during the preceding operating cycle of the machine, time controlled means for locking said die parts open in response to the lapse of a predetermined time period during which said die parts stand open and which starts with termination of each pellet preheating interval, and manually operable means for controlling said injecting means to eject the cooled pellet while said die parts remain open.

15. An automatically sequenced cyclically operative plastic molding machine comprising means defining a pellet forming chamber, an injection chamber and a molding chamber, transfer means for successively transferring pellets of plastic material formed in said forming chamber to said injection chamber and then to said molding chamber, and intercoacting and entirely automatic sequencing means for controlling said transfer means to subject each pellet to a different transfer operation during successive operating cycles of the machine and to effect pellet transfer to each of said injection and molding chambers during each operating cycle of the machine.

16. An automatically sequenced and cyclically operative plastic molding machine comprising means defining a pellet forming chamber, an injection chamber and a molding chamber, transfer means for successively transferring pellets of plastic material formed in said forming chamber to said injection chamber and then to said molding chamber, means for controlling said transfer means to subject each pellet to a different transfer operation during successive operating cycles of the machine and to effect pellet transfer to each of said injection and molding chambers during each operating cycle of the machine, and high frequency electric heating means controlled by said last-named means to preheat each formed pellet of plastic material during its transfer from said forming chamber to said injection chamber.

17. A cyclically operative plastic molding machine comprising means defining a pellet forming chamber, a pellet preheating chamber, an injection chamber and a molding chamber, control means, transfer means responsive to operation of said control means for transferring a formed pellet of plastic material from said forming chamber to said preheating chamber and for measuring a charge of plastic material for delivery to said forming chamber and for effecting transfer of a preheated pellet to said injection chamber, high frequency electric heating means responsive to operation of at least a part of said transfer means for preheating the pellet transferred to said preheating chamber, and means responsive to operation of at least a part of said transfer means for injecting the preheated pellet from said injection chamber into said molding chamber.

18. A cyclically operative plastic molding machine comprising relatively movable molding dies, hydraulic means for opening and closing said dies, a storage chamber for plastic materials, hydraulic actuated pellet forming means for compressing a measured charge of plastic material into a pellet, hydraulic actuated means for receiving a measured charge of plastic material from said storage chamber and for delivering the measured charge to said pellet forming means, hydraulically actuated injecting means for injecting the formed pellets into said dies one at a time, hydraulically actuated transfer means for transferring each pellet formed by said pellet forming means to a position to be injected into said dies by said injecting means, heating means for preheating each pellet during an interim period between transfer operations by said transfer means, timing means for controlling the duration of the preheating intervals, and electrical means in part controlled by at least a part of the preceding named means for causing said preceding named means to operate in a predetermined sequence during each operating cycle of said machine.

19. A unitary and cyclically operative plastic molding machine for thermosetting materials comprising means for measuring and delivering a measured charge of said material for a preforming operation, hydraulic propelled means for compressing each charge during its preforming operation, high frequency electrical heating means for preheating preformed charges to a temperature just below the thermosetting temperature thereof, a pair of die members and reversible hydraulic means for closing them prior to charging, reversible hydraulic means for injecting at least one preheated preformed charge into the closed die members during each operating cycle of the machine, means for regulating the time of preheating of the preformed charges, curing timing means for regulating the duration of curing of each mold charge in the die members, and an electrically controlled valve system in part controlled by said curing timing means and in part sequenced by the other preceding named means for regulating the distribution of propelling and reversing hydraulic pressure fluids to each of said hydraulic means during each operating cycle of the machine.

RAYMOND M. ALDEN.

REFERENCES CITED

The following references are of record in the file of this patent:

UNITED STATES PATENTS

| Number | Name | Date |
|---|---|---|
| 1,849,027 | Pardee | Mar. 8, 1932 |
| 2,187,212 | MacMillin | Jan. 16, 1940 |
| 2,269,388 | Weida | Jan. 6, 1942 |
| 2,287,277 | Ryder | June 23, 1942 |
| 2,304,141 | Bergmann | Dec. 8, 1942 |
| 2,318,031 | Tucker | May 4, 1943 |
| 2,339,607 | Smith | Jan. 18, 1944 |
| 2,347,971 | Sayre | May 2, 1944 |
| 2,398,318 | MacMillin | Apr. 9, 1946 |
| 2,404,559 | Ashbaugh | July 23, 1946 |
| 2,436,999 | MacMillin et al. | Mar. 2, 1948 |

OTHER REFERENCES

Moran et al.: Short Waves and Transfer Molding from Modern Plastics, pp. 116, 117, 118, 166, 168, June 1944. Ele. Heat Dig.